(12) United States Patent
Vanderhelm

(10) Patent No.: US 7,505,781 B2
(45) Date of Patent: Mar. 17, 2009

(54) CORE WIRELESS ENGINE

(75) Inventor: Ronald John Vanderhelm, Surrey (CA)

(73) Assignee: Sierra Wireless, Inc., Richmond, BC (CA)

( * ) Notice: Subject to any disclaimer, the term of this patent is extended or adjusted under 35 U.S.C. 154(b) by 506 days.

(21) Appl. No.: 10/038,124

(22) Filed: Jan. 2, 2002

(65) Prior Publication Data

US 2003/0125082 A1  Jul. 3, 2003

(51) Int. Cl.
*H04M 1/00* (2006.01)
(52) U.S. Cl. ............... 455/550.1; 455/556.1; 455/90.3; 343/702; 361/636
(58) Field of Classification Search ................ 455/558, 455/557, 552.1, 553.1, 226.1, 90.3, 550.1, 455/556.1; 370/335, 342, 441, 338; 361/636, 361/683, 684, 728, 730, 737; 343/702; 712/39
See application file for complete search history.

(56) References Cited

U.S. PATENT DOCUMENTS

| | | | | |
|---|---|---|---|---|
| 5,600,845 | A * | 2/1997 | Gilson | 712/39 |
| 5,610,941 | A | 3/1997 | Tanaka et al. | |
| 5,649,224 | A * | 7/1997 | Scheer | 710/300 |
| 5,682,548 | A * | 10/1997 | Moore | 710/3 |
| 5,889,816 | A | 3/1999 | Agrawal et al. | |
| 6,404,393 | B1 * | 6/2002 | Nelson et al. | 343/702 |
| 6,539,438 | B1 * | 3/2003 | Ledzius et al. | 710/8 |
| 6,778,519 | B1 * | 8/2004 | Harrell et al. | 370/342 |
| 6,782,245 | B1 * | 8/2004 | Lazzarotto et al. | 455/226.1 |
| 6,928,301 | B2 * | 8/2005 | Souissi et al. | 455/557 |
| 7,092,375 | B2 * | 8/2006 | Pitsoulakis | 370/338 |
| 2002/0054232 | A1 * | 5/2002 | Inagaki | 348/372 |
| 2002/0063162 | A1 * | 5/2002 | Endejan et al. | 235/486 |
| 2002/0118135 | A1 * | 8/2002 | Johnson et al. | 343/702 |
| 2002/0118507 | A1 * | 8/2002 | Paredes et al. | 361/684 |
| 2002/0151275 | A1 * | 10/2002 | Trost et al. | 455/41 |
| 2002/0176223 | A1 * | 11/2002 | Shiozaki | 361/636 |
| 2003/0040222 | A1 * | 2/2003 | Price et al. | 439/638 |
| 2003/0059039 | A1 * | 3/2003 | Meyerson et al. | 379/428.04 |
| 2003/0084220 | A1 * | 5/2003 | Jones et al. | 710/301 |

FOREIGN PATENT DOCUMENTS

| | | |
|---|---|---|
| EP | 0 789 468 A1 | 8/1997 |
| EP | 0 860 781 A2 | 8/1998 |
| EP | 1 001 348 A2 | 5/2000 |
| GB | 2 285 558 A | 7/1995 |
| GB | 2 292 291 A | 2/1996 |
| WO | WO 95/12251 A1 | 5/1995 |

OTHER PUBLICATIONS

PCT International Search Report, PCT/CA 03/00002, International filing date Jan. 2, 2003, date Search Report mailed Jul. 4, 2003.

* cited by examiner

*Primary Examiner*—Danh C Le
(74) *Attorney, Agent, or Firm*—Nixon Peabody LLP

(57) ABSTRACT

A core wireless engine design includes the standardized CWE interface. The core wireless engine includes a transceiver, microprocessor and a standardized interface arrangement. The standardized interface arrangement is adapted to be connected to a variety of different host interfaces. This arrangement allows core wireless engines to be used with a variety of different host interfaces and form factors. In a preferred embodiment, the core wireless engine design is sized so that it can fit into a variety of form factor units.

26 Claims, 6 Drawing Sheets

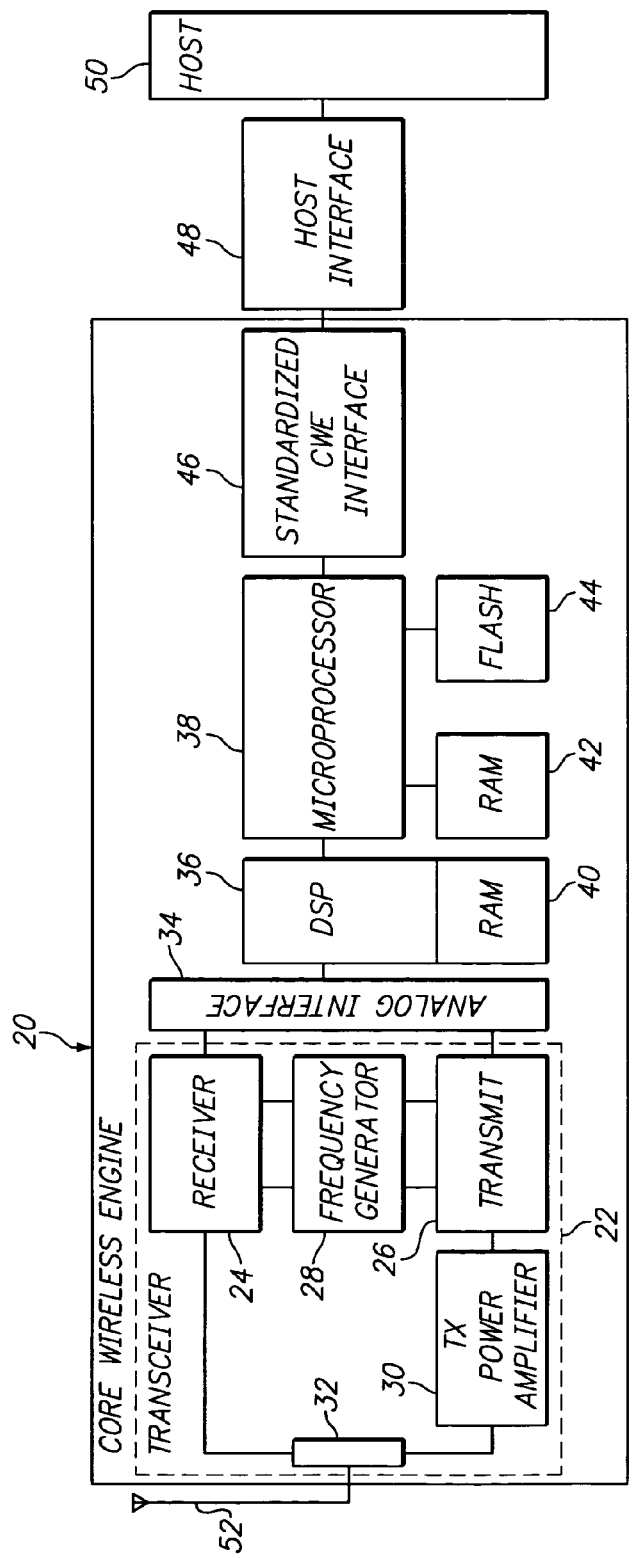
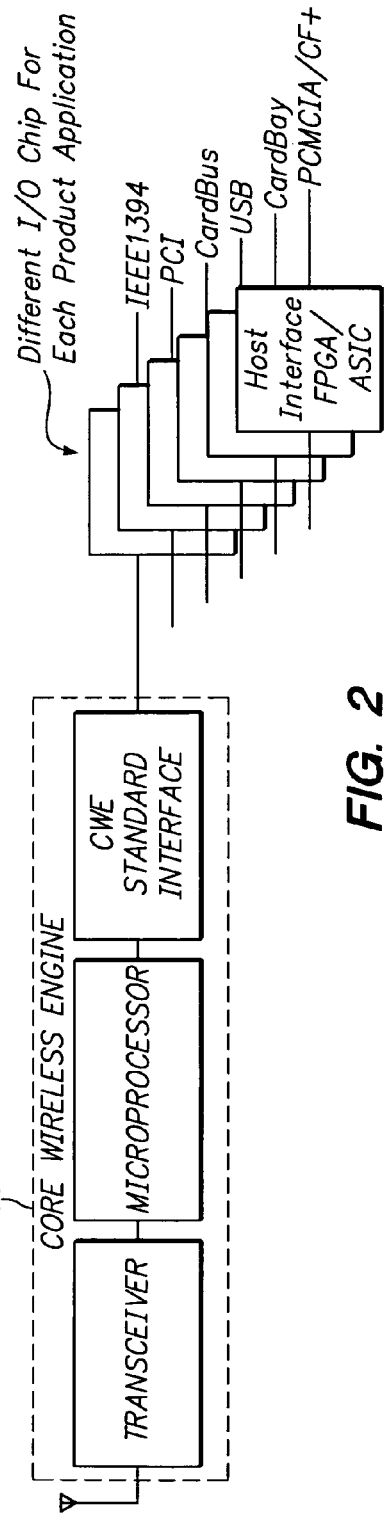
FIG. 1
FIG. 2

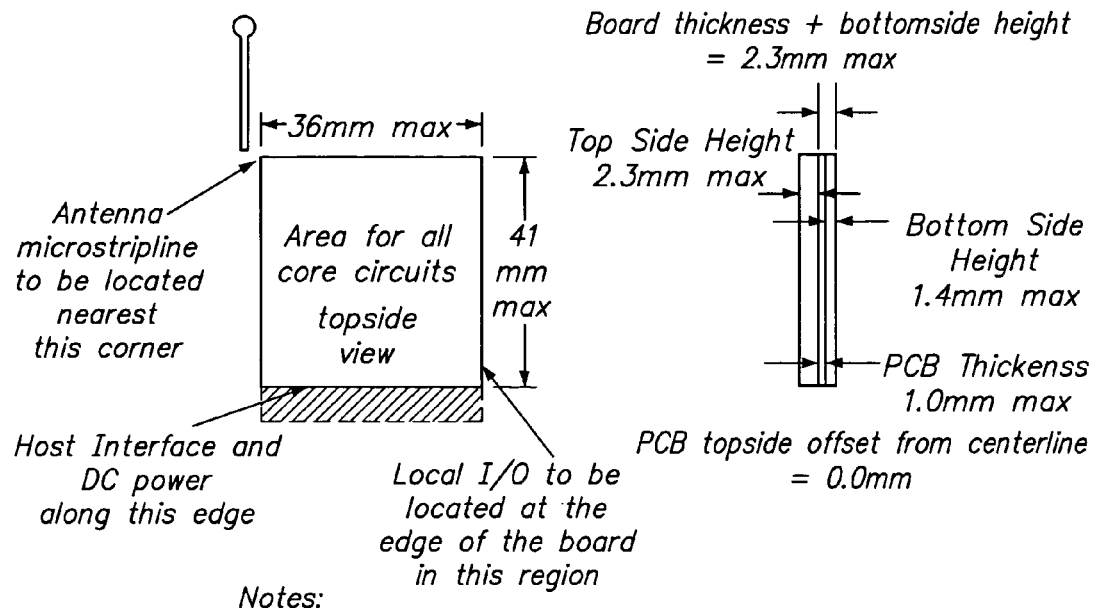

Notes:
1) RF connector and host connector fall outside the defined area, but nearest the locations shown.

2) Shielding is to be included within the dimensions shown.

3) Indicator LEDs, host connectors and other optional peripherals may be outside the dimension shown.

4) PCB Thickness at host connector will require additional buildup to 1mm when building a Mini-PCI type 3 product if core design has pcb less than 1.0mm thick

FIG. 7

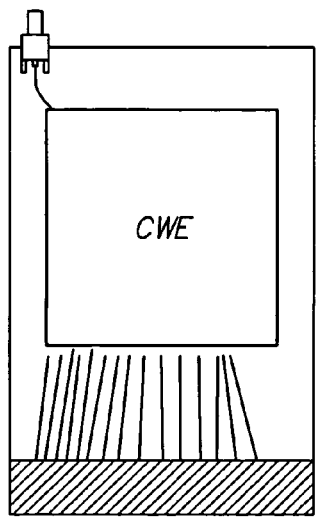

FIG. 8A

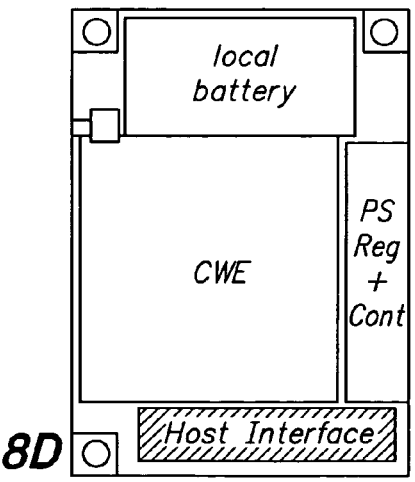

FIG. 8D

CORE WIRELESS ENGINE

BACKGROUND OF THE INVENTION

The present invention relates to wireless modem units.

Typically, wireless modem units are used with personal data assistants (PDAs), notebook computers and other digital devices to allow connection to a cellular network by the data device. The wireless modem units typically include a transceiver and a processor. Data is transferred between the wireless modem unit and the data device in a standardized way. Typically, each form factor has its own interface design. Additionally, each form factor has a different size. For these reasons, in the past, the wireless modem units were specifically designed for a predetermined form factor. For example, larger form factor units took advantage of the greater available size.

Typically, the wireless modem unit's design is different for each form factor. This leads to increased wireless modem design costs.

It is desired to have a design for a wireless modem unit which avoids some of the problems of the prior art.

SUMMARY OF THE INVENTION

The present invention comprises a core wireless engine (CWE) design that can be used with a variety of different form factor units. This core wireless engine design is preferably sized such that it fits into a variety of different form factor units. Additionally, the core wireless engine design preferably has a standardized interface arrangement that allows a core wireless design to be interconnected with a variety of different types of host interfaces. By standardizing the core wireless design, the production of wireless modem units for a variety of different form factors is simplified and, thus, costs are reduced.

One embodiment of the present invention comprises a core wireless engine design, including a transceiver, a microprocessor and a standardized interface arrangement. The standardized interface arrangement is adapted to be interconnected to a variety of host interfaces.

Another embodiment of the present invention is a core wireless engine design comprising a transceiver, a microprocessor and a standardized interface arrangement. The standardized interface arrangement is adapted to be interconnected to a variety of host interfaces. The core wireless design is adapted to fit into a variety of form factor units.

Yet another embodiment of the present invention comprises a core wireless engine design comprising a transceiver, a microprocessor and a standardized interface arrangement. The core wireless design is adapted to fit into a variety of form factors, including the PCMCIA form factor and the Compact Flash card form factor.

Another embodiment of the present invention comprises a method of producing a wireless modem unit. The method includes the step of selecting a core wireless design from a number of core wireless engine designs. Each core wireless engine design has a standardized interface arrangement adapted to be interconnected to a variety of host interfaces. The core wireless design is adapted to fit into a variety of form factors. The method also includes the step of selecting a host interface and form factor unit from the variety of host interfaces and variety of form factor units and combining the selected core wireless design and selected host interface and form factor unit to produce the wireless modem unit.

In a preferred embodiment, for any given communications protocol standard (such as IS95A CDMA, CDPD, GPRS, UMTS, etc.), the core wireless engine includes the electronics and firmware necessary to execute the entire communications protocol for data communications from connection to the antenna up to and including the OSI transport layer. The CWE includes volatile and non-volatile program and data storage as required to meet this requirement.

BRIEF DESCRIPTION OF THE DRAWING FIGURES

FIG. 1 is a diagram that illustrates a core wireless engine unit in one embodiment of the present invention.

FIG. 2 is a diagram that illustrates the ability of the core wireless engine to be connected to different host interfaces.

FIG. 7 is a diagram that illustrates the physical dimensions of one embodiment of the core wireless engine that allows it to fit within a variety of different form factor units.

FIGS. 8A-8F are diagrams that illustrate the core wireless engine positioned within a number of form factor units.

DETAILED DESCRIPTION OF THE PREFERRED EMBODIMENT

Figure 3:
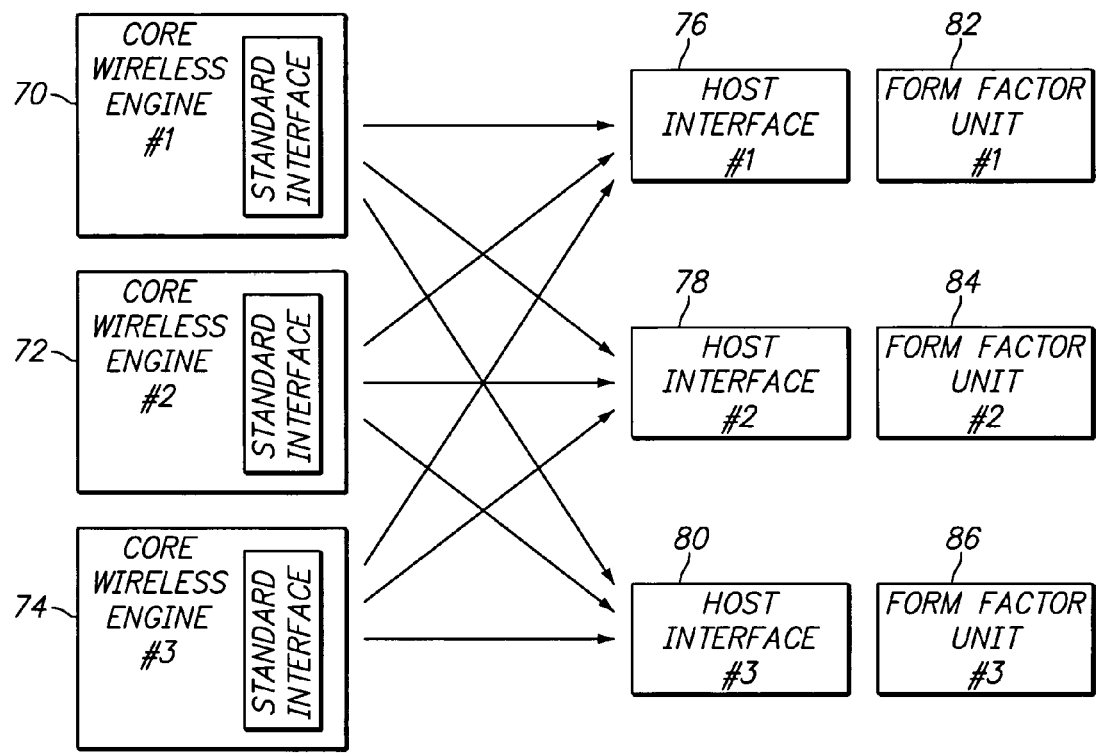
FIG. 3 is a diagram that illustrates the connection of different core wireless engine designs with different host interfaces and form factors.

FIG. 1 illustrates a core wireless engine 20 of one embodiment. The core wireless engine includes a transceiver unit 22 that in one embodiment comprises a receiver unit 24, a transmitter unit 26, a frequency generator unit 28, a transmitter power amplifier 30 and a multiplexer unit 32. The transceiver unit 22 interacts with the remainder of the core wireless engine through an analog interface 34 which preferably consists of digital-to-analog and analog-to-digital converters. In one embodiment, the core wireless engine 20 also includes a digital signal processor (DSP) 36 and microprocessor 38. The digital signal processor 36 and microprocessor 38 are associated with memory within the core wireless engine. In this example the memory includes a Random Access Memory (RAM) 40, associated with the DSP 36 and a RAM 42 and flash memory 44 associated with microprocessor 38. The core wireless engine 20 has a standardized core wireless engine interface 46. The standardized interface as described below in one embodiment is a standardized arrangement of bus lines. In another embodiment, the standardized interface comprises a standardized register set. The standardized CWE interface is interpreted by the host interface 48 in a standard way. The host interface 48 allows the interconnection to a host 50 according to a form factor based standard. As will be described below, in one embodiment the host interface 48 is placed within the core wireless engine (if the core wireless engine design uses a field programmable gate array (FPGA)) within available space.

Also associated with the core wireless engine is an antenna 52. This antenna 52 can be a small strip antenna.

FIG. 2 illustrates that the core wireless engine 60 is attachable to a variety of different host interfaces. In this example, host interfaces for IEEE 1394, a Peripheral Component Interconnect (PCI), CardBus, Universal Serial Port (USB), Card-Bay, Personal Computer Memory Card International Association (PCMCIA) standards are shown. Since a standardized CWE interface is used, this allows the host interfaces to be designed to interface with the same standardized CWE interface.

FIG. 3 illustrates this in more detail. In FIG. 3, a variety of different core wireless engines 70, 72 and 74 are shown. The core wireless engines can use different transmission standards. Transmission standards that can be used include time division multiple access (TDMA), code division multiple access (CDMA), cellular digital packet data (CDPD), Ricochet, general packet radio standard (GPRS), and the IEEE 802.11 wireless standard.

Note that each of the core wireless engines 70, 72 and 74 includes a standardized CWE interface. The standardized CWE interface allows a connection to a variety of different standard designed host interfaces, such as host interface 76, 78 and 80. The host interfaces can be placed within different form factors 82, 84 and 86. The different host interfaces and form factors can include PCMCIA, Compact Flash, USB, PCI or any other type of form factor. Note that having a standardized interface within the core wireless engine allows the connection of a specific core wireless design to a variety of different host interfaces. Also each host interface can be connected to a variety of different core wireless engines. This simplifies the production of the wireless modem unit and can reduce the cost of the systems.

In one embodiment, the core wireless engines include a field programmable gate array (FPGA). In some situations, the FPGA allows the placement of the host interface within the core wireless engine.

Figure 4A:
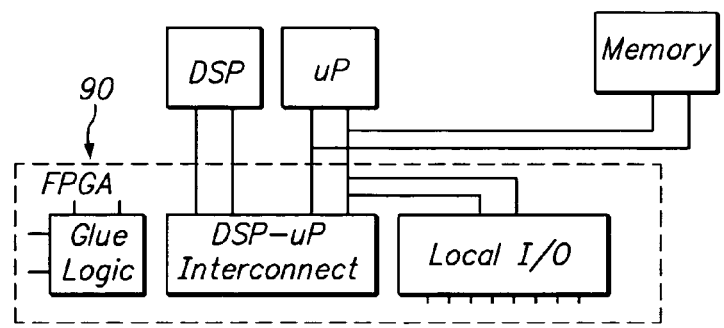
FIGS. 4A and 4B are diagrams that illustrate the use of a field programmable gate array (FPGA) in the core wireless engine that allows the host interface to be located within the core wireless engine.
Figures 4B, 5:
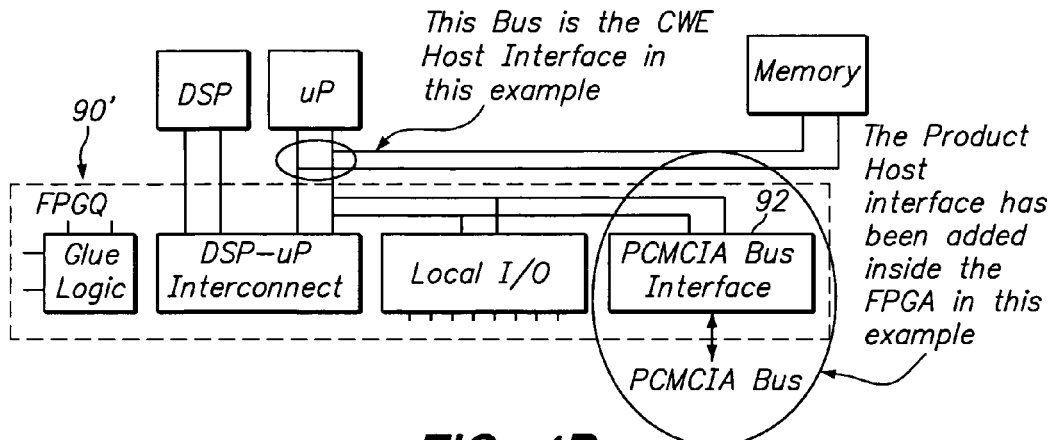
FIG. 5 is a diagram that illustrates a register set for one embodiment of a CWE standardized interface.

FIG. 4A illustrates a core wireless engine with a field programmable gate array 90. As shown in FIG. 4B, if the field programmable gate array 90' is sufficiently large, a host interface, such as the PCMCIA bus interface 92, can be placed inside the field programmable gate array.

FIG. 5 is a diagram of one embodiment of the core wireless engine standardized interface. In this example, the registers of the core wireless engine are shown. These registers are accessed by the standardized host interfaces in a standardized manner. Rather than redesigning the interaction between the core wireless design and the host interface each time differently, the standard interface (preferably with the standard register set) makes it possible to connect together the different units without a core wireless engine redesign.

Figure 6:
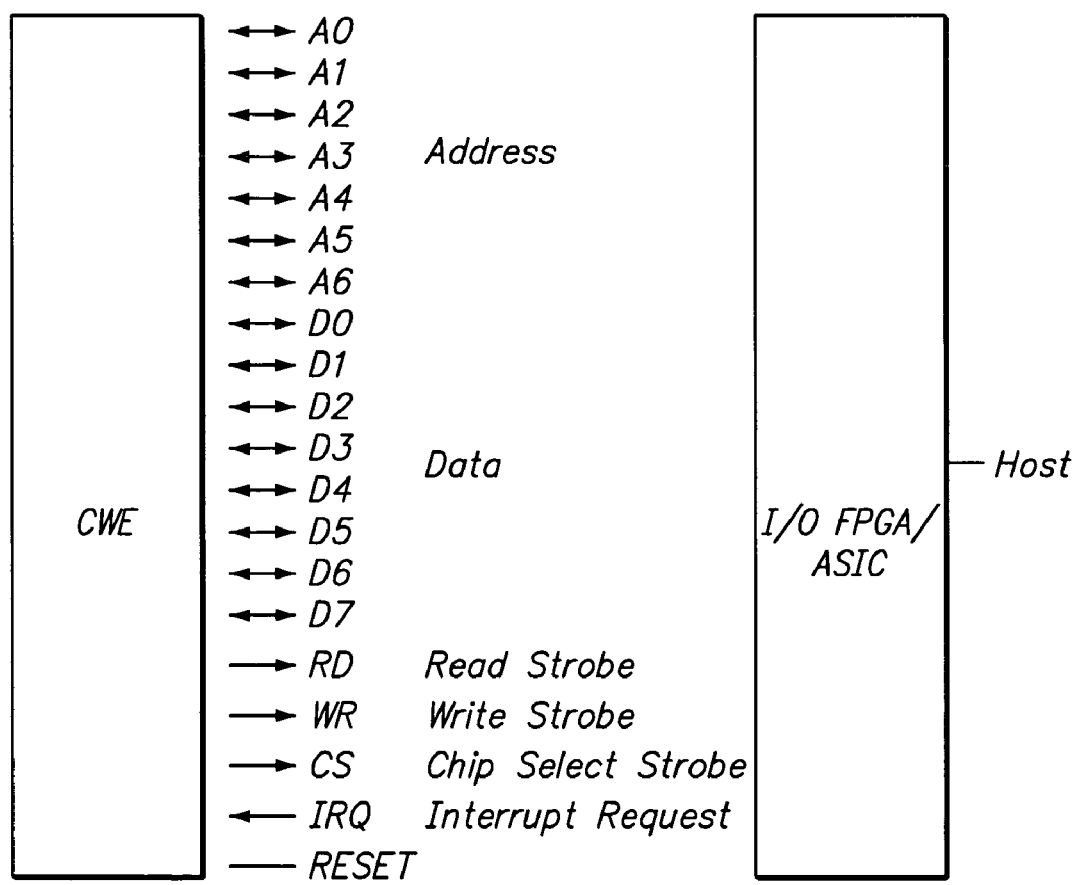
FIG. 6 is a diagram that illustrates one embodiment of the signals which are sent in the standardized interface between the core wireless engine and the host interface of one embodiment of the present invention.

FIG. 6 is a diagram that illustrates an example of interface logic lines between the microprocessor of the core wireless engine and the host interface. The host interface uses the lines and the registers to produce the connection to the host as required by the standard.

Another embodiment of the present invention concerns the design of the core wireless engine such that it fits within a variety of different form factor units. FIG. 7 is a diagram that illustrates the physical dimensions of one embodiment of the core wireless engine that allows it to fit within a variety of different form factor units. In a preferred embodiment, the core wireless engine includes a Printed Circuit Board (PCB) thinner than one millimeter at maximum. The top side preferably has a height of 2.3 millimeter maximum. The bottom side height is 1.4 millimeter maximum, with the combination of the board thickness and the bottom side height at 2.3 millimeter maximum, producing a total of 4.6 millimeter maximum thickness. The width of the core wireless engine unit is preferably 36 millimeters, with a height of 41 millimeters. The host interface and DC power are connected along one of the 36 millimeter maximum edges. The physical dimension of the core wireless engine allows the device to be placed within a variety of different form factor units. As shown, note that the circuit board plane is offset from the assembly center line.

The electronic circuits used in the core wireless engine in one embodiment include a DSP chip, a microprocessor chip, a memory chip and a field programmable gate array (FPGA) that includes the CWE interconnect glue logic, local input/output and, preferably, the host interface units. The core wireless engine also preferably includes radio frequency (RF) shielding.

Figure 8B:
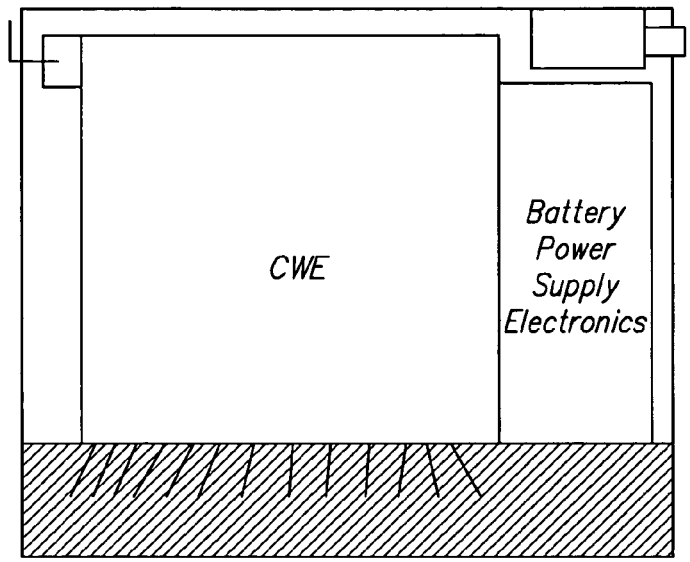
Figure 8C:
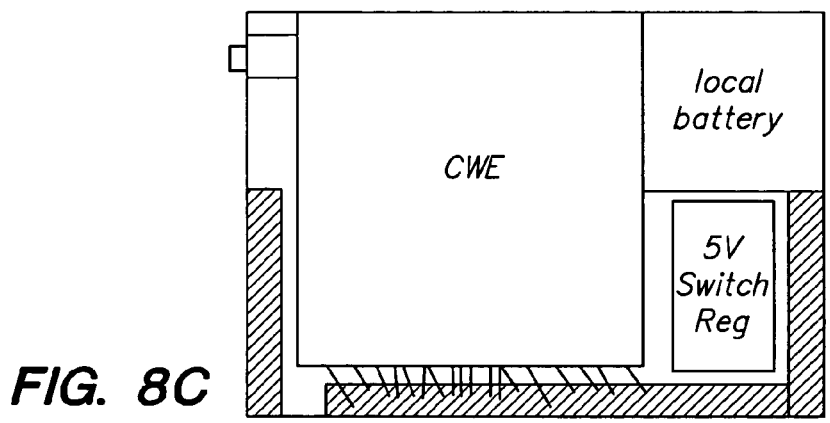
Figure 8E:
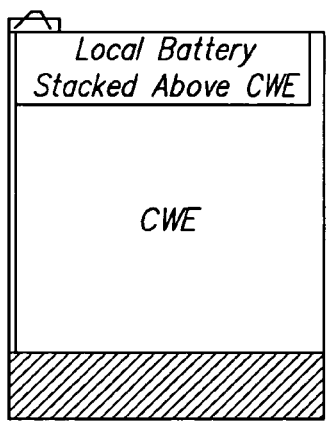
Figure 8F:
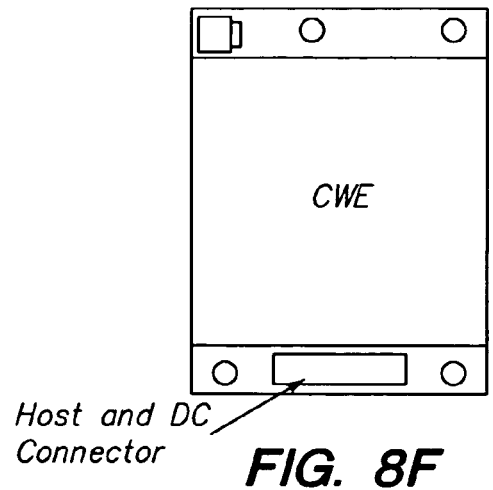

FIGS. 8A-8F illustrate the placement of a core wireless engine within a variety of different form factors. FIG. 8A illustrates the core wireless engine placed within a PCMCIA card. FIG. 8B illustrates a core wireless engine placed within a Handspring Visor Springboard Module. FIG. 8C illustrates positioning of the core wireless engine within a mini PCMCIA type 3B card. FIG. 8D illustrates the positioning of the core wireless engine within a PCB outline mini PCI type 1A card. FIG. 8E illustrates the positioning of the core wireless engine within an extended Compact Flash unit. FIG. 8F illustrates the use of the core wireless engine within an embedded module.

The standards for the size of the core wireless engine facilitate the CWE's positioning within a variety of different form factor units. The size of the core wireless engine is the largest common area of a variety of different standards. In one embodiment, the size of the core wireless engine is the largest common area of the PCMCIA type 2, Compact Flash type 2, extended Compact Flash, mini PCI types 1, 2, and 3, Handspring Visor Springboard, as well as SB 300 and leading competitors products. This thickness is chosen since the PCMCIA type 2, Compact Flash type 2 and mini PCI all share a maximum package thickness requirement of 5 millimeters. The mini PCI type 3 brings the additional requirement that the PCB be about 1 millimeter thick to suit the board edge connection. The metal covers for the PCMCIA and the Compact Flash requires a budget of 0.4 millimeters of the 5 millimeter total and the connection requirements tend to limit the location of the printed circuit board within the package.

A common software interface can be used for all of the core wireless engines to allow the standardization between all of the core wireless engines. This can allow for standardized operation. It is possible that a common software interface would be too difficult for all of the core wireless engines. In this case, the supply of the necessary drivers to run a host-operated system are provided in the host device. Preferably the drivers adapt automatically to the type of card and style without intervention by the assembler.

It will be appreciated by those of ordinary skill in the art that the invention can be implemented in other specific forms without departing from the spirit or character thereof. The presently disclosed embodiments are therefore considered in all respects to be illustrative and not restrictive. The scope of the invention is illustrated by the appended claims rather than the foregoing description, and all changes that come within the meaning and range of equivalents thereof are intended to be embraced herein.

What is claimed is:
1. A core wireless engine design comprising:
a transceiver;
a microprocessor;
a standardized interface arrangement adapted to be interconnected to a variety of types of host interfaces implementing a plurality of bus standards; and a host interface positioned within a field programmable gate array, wherein the host interface configured to interface with the standardized interface arrangement;

wherein the core wireless engine design is adapted to mount on a printed circuit board that is offset from a centerline that defines the thickness of a form factor unit in which the core wireless engine design is housed.

2. The core wireless engine design of claim 1 wherein the core wireless engine is designed to fit into a variety of form factor units.

3. The core wireless engine design of claim 2 wherein the core wireless engine is designed to fit within PCMCIA and Compact Flash cards.

4. The core wireless engine design of claim 1 wherein the variety of host interfaces includes a PCMCIA interface and a Compact Flash card interface.

5. The core wireless engine design of claim 1 wherein the variety of host interfaces includes a PCMCIA interface as well as a Compact Flash interface.

6. The core wireless engine design of claim 2 wherein the variety of form factors includes a Compact Flash form factor.

7. The core wireless engine design of claim 2 wherein the core wireless engine is housed in a form factor that is less than 5 millimeters thick.

8. A design according to claim 1 wherein the core wireless engine is less than 36 millimeters wide and 41 millimeters high.

9. A core wireless engine design comprising:
a transceiver;
a microprocessor;
a standardized interface arrangement adapted to be interconnected to a variety of types of host interfaces implementing a plurality of bus standards;
a host interface positioned within a field programmable gate array, wherein the host interface configured to interface with the standardized interface arrangement;
wherein the core wireless design is adapted to fit into a variety of form factor units; and
wherein the core wireless engine design is adapted to mount on a printed circuit board that is offset from a centerline that defines the thickness of a form factor unit in which the core wireless engine design is housed.

10. The core wireless engine design of claim 9 wherein the standardized interface arrangement includes a standardized set of registers.

11. The core wireless engine design of claim 9 wherein the variety of host interfaces include a PCMCIA interface as well as a Compact Flash interface.

12. The core wireless engine design of claim 9 wherein the variety of form factors includes a Compact Flash form factor.

13. The core wireless engine design of claim 9 wherein the core wireless engine is housed in a form factor that is less than 5 millimeters thick.

14. A design according to claim 9 wherein the core wireless engine is less than 36 millimeters wide and 41 millimeters high.

15. A core wireless engine design comprising:
a transceiver;
a microprocessor; and
a standardized interface arrangement adapted to be interconnected to a variety of types of host interfaces implementing a plurality of bus standards, each host interface designed to interface with the standardized interface arrangement,
wherein the core wireless engine design is adapted to fit into a variety of form factor units including PCMCIA and Compact Flash cards, and
wherein the core wireless engine is further adapted to fit within a Handspring Visor Springboard card.

16. The core wireless engine design of claim 15 wherein the core wireless design is further adapted to fit within the form factor of a mini PCI card.

17. The core wireless engine design of claim 15 wherein the standardized interface arrangement is adapted to be interconnected to a variety of host interfaces.

18. The core wireless engine design of claim 15 wherein the variety of host interfaces includes a PCMCIA interface as well as a Compact Flash interface.

19. The core wireless engine design of claim 15 wherein the variety of form factors includes a Compact Flash form factor.

20. The core wireless engine design of claim 15 wherein the standardized size is less than 5 millimeters thick.

21. The core wireless engine design of claim 15 wherein the standardized size is less than 36 millimeters wide and 41 millimeters high.

22. A method of producing a wireless modem unit, comprising:
selecting a core wireless design from a number of core wireless engine designs, each core wireless engine design having a standardized interface arrangement adapted to be interconnected to a variety of types of host interfaces implementing a plurality of bus standards, each host interface designed to interface with the standardized interface arrangement, the core wireless design adapted to fit into a variety of form factor units and wherein the core wireless engine is adapted to mount on a printed circuit board that is offset from a centerline that defines the thickness of a form factor unit in which the core wireless engine design is housed; and
selecting a host interface and form factor unit from the variety of host interfaces and variety of form factor units and combining the selected core wireless design and selected hot interface and form factor unit to produce a wireless modem unit.

23. The method of claim 22 wherein the variety of host interfaces includes a PCMCIA interface as well as a Compact Flash interface.

24. The method of claim 22 wherein the variety of form factors includes a Compact Flash form factor.

25. The method of claim 22 wherein the standardized size is less than 5 millimeters thick.

26. The method of claim 22 wherein to standardized size is less than 36 millimeters wide and 41 millimeters high.

* * * * *